July 11, 1944.   E. S. SMITHSON   2,353,419
MACHINE FOR FORMING BOX BLANKS
Filed June 11, 1942   11 Sheets-Sheet 2

EUGENE S. SMITHSON
INVENTOR
BY Clarence W. Carroll
AGENT

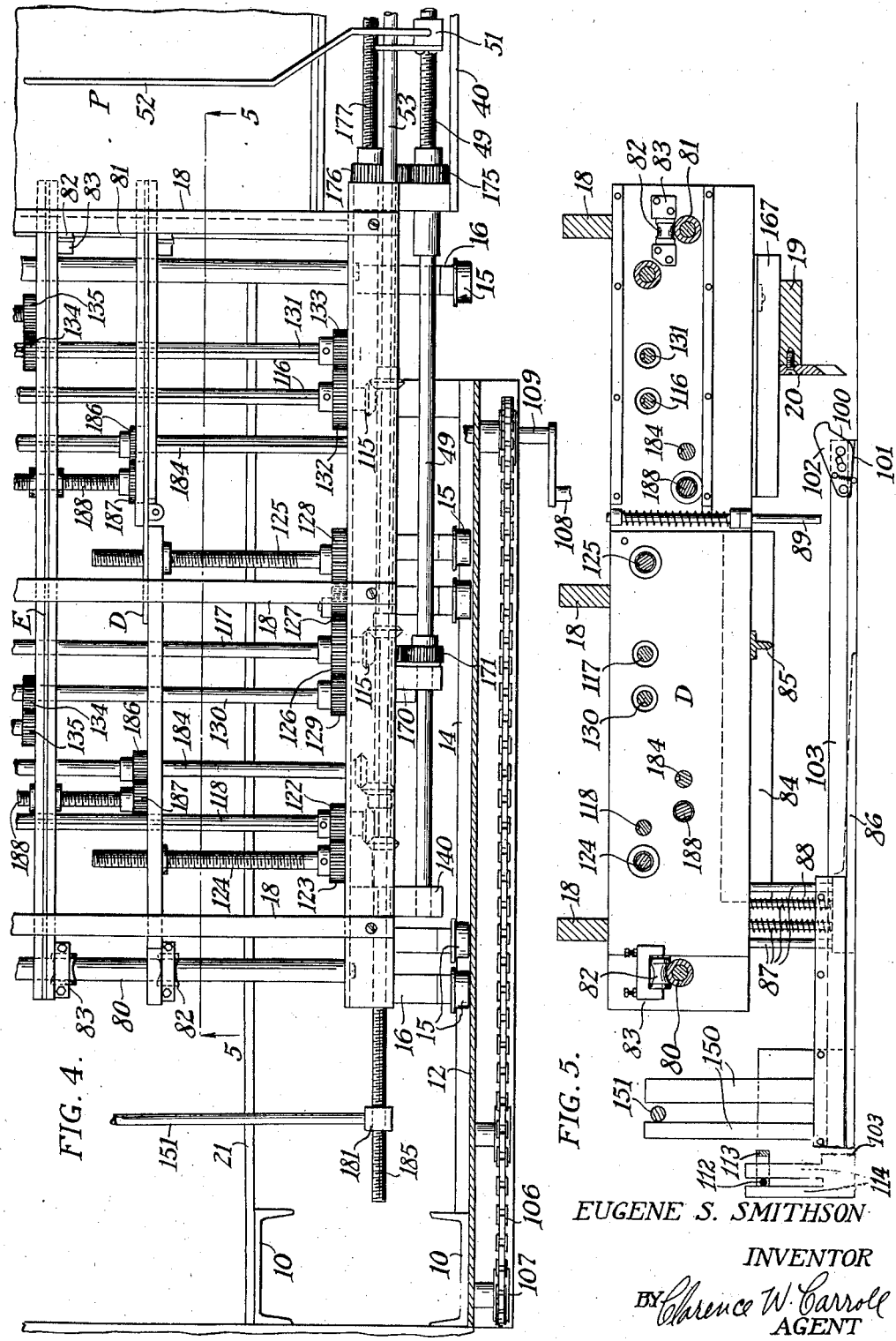

July 11, 1944.  E. S. SMITHSON  2,353,419
MACHINE FOR FORMING BOX BLANKS
Filed June 11, 1942    11 Sheets-Sheet 4
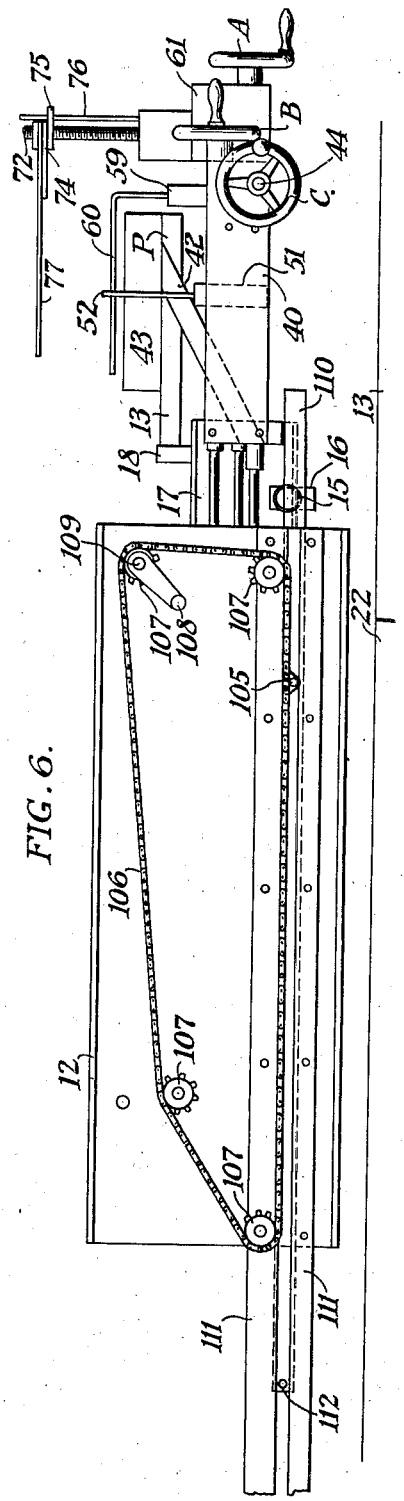
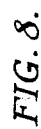
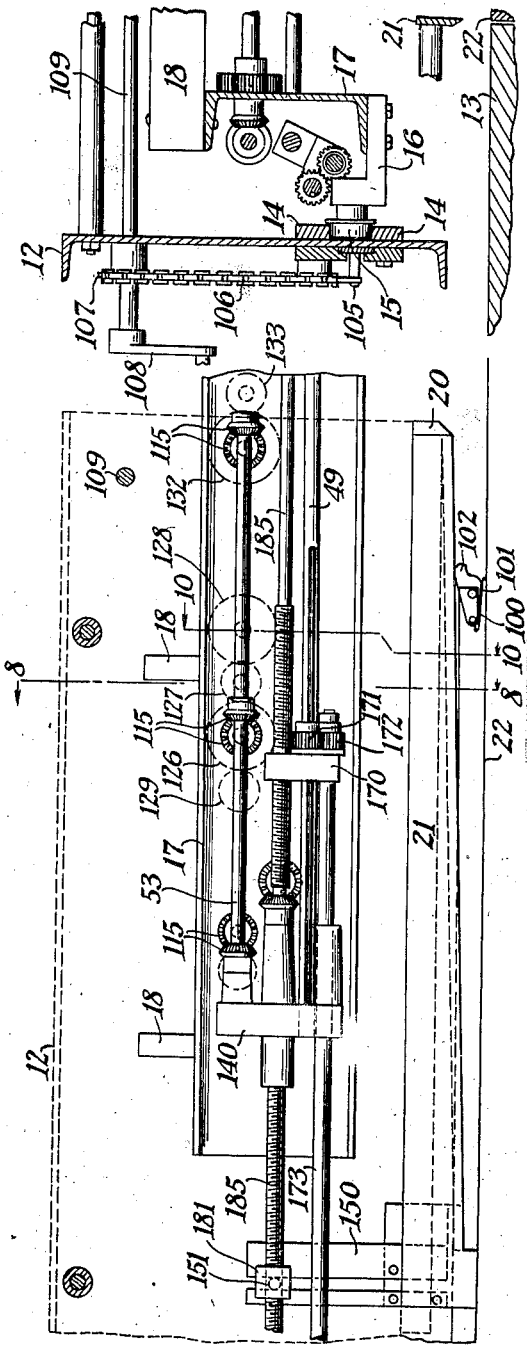
EUGENE S. SMITHSON
INVENTOR
BY Clarence W. Carroll
AGENT July 11, 1944.  E. S. SMITHSON  2,353,419
MACHINE FOR FORMING BOX BLANKS
Filed June 11, 1942  11 Sheets-Sheet 5
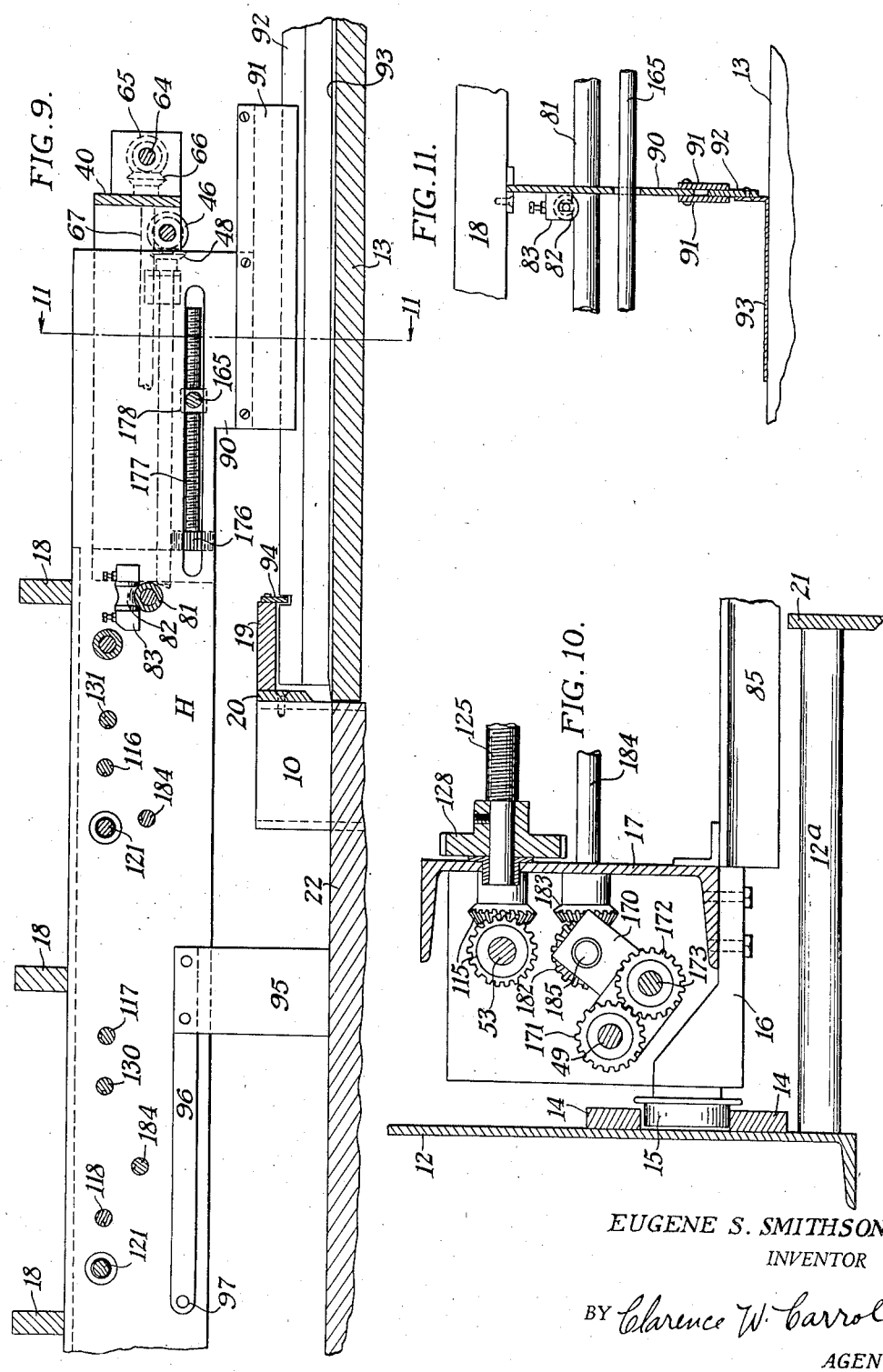
EUGENE S. SMITHSON
INVENTOR
BY Clarence W. Carroll
AGENT July 11, 1944.  E. S. SMITHSON  2,353,419
MACHINE FOR FORMING BOX BLANKS
Filed June 11, 1942  11 Sheets-Sheet 6
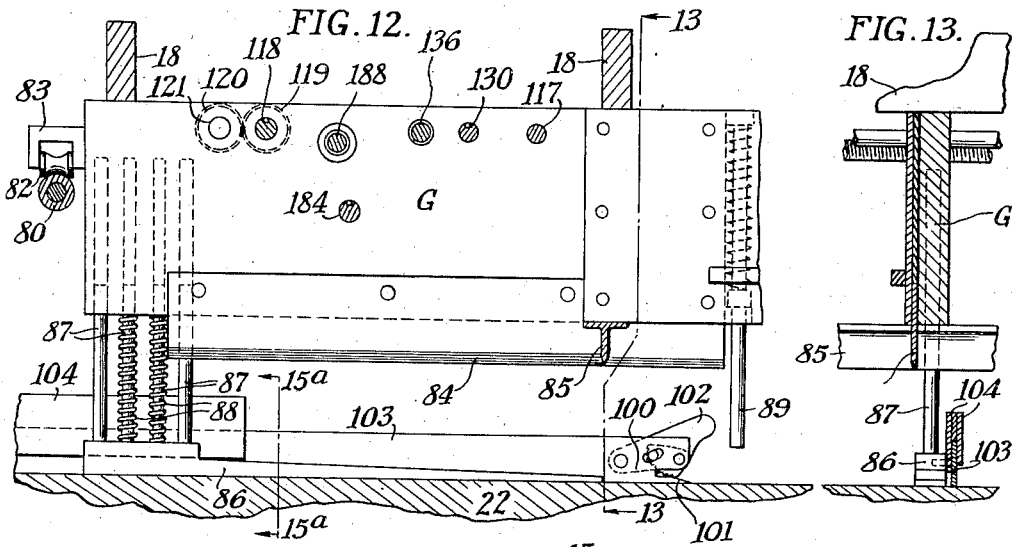
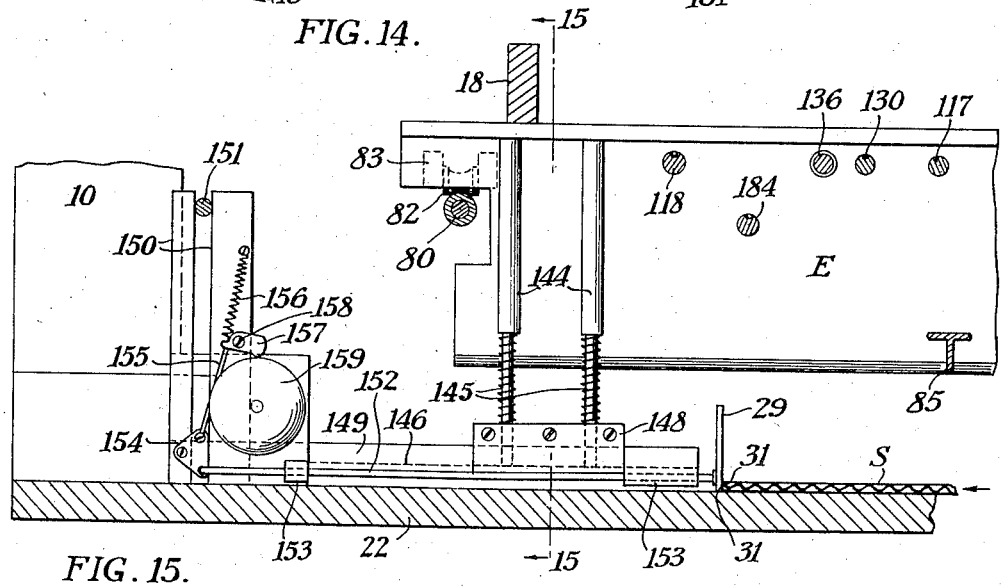
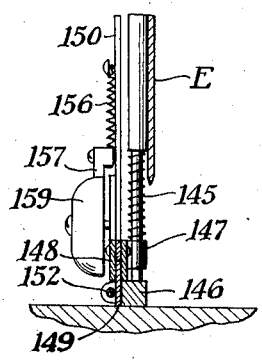
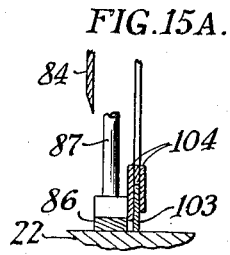
EUGENE S. SMITHSON
INVENTOR
BY Clarence W. Carroll
AGENT

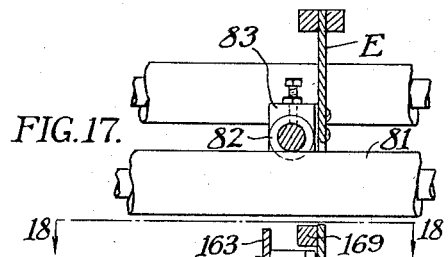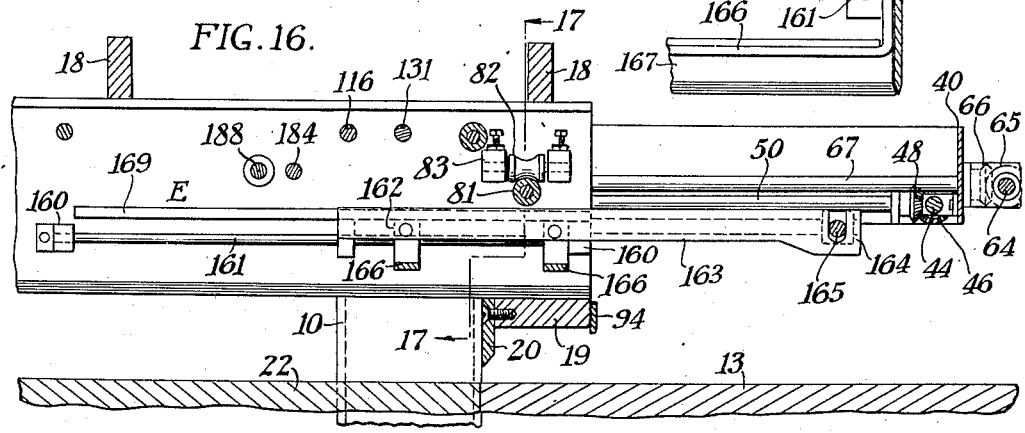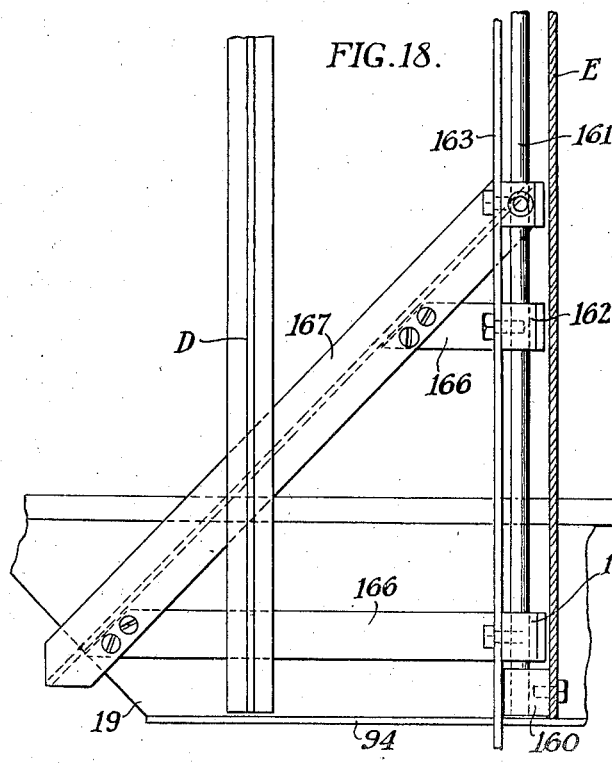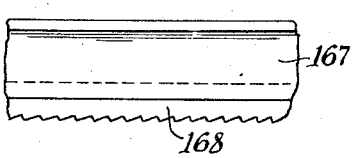

July 11, 1944.    E. S. SMITHSON    2,353,419
MACHINE FOR FORMING BOX BLANKS
Filed June 11, 1942    11 Sheets-Sheet 8
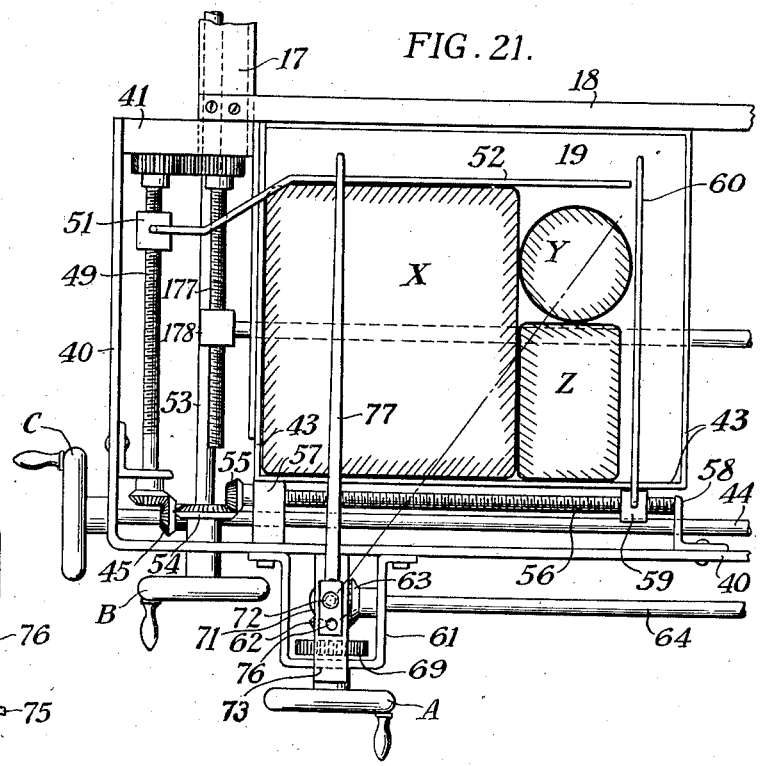
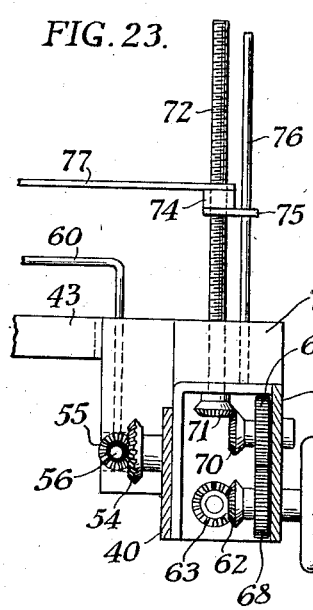
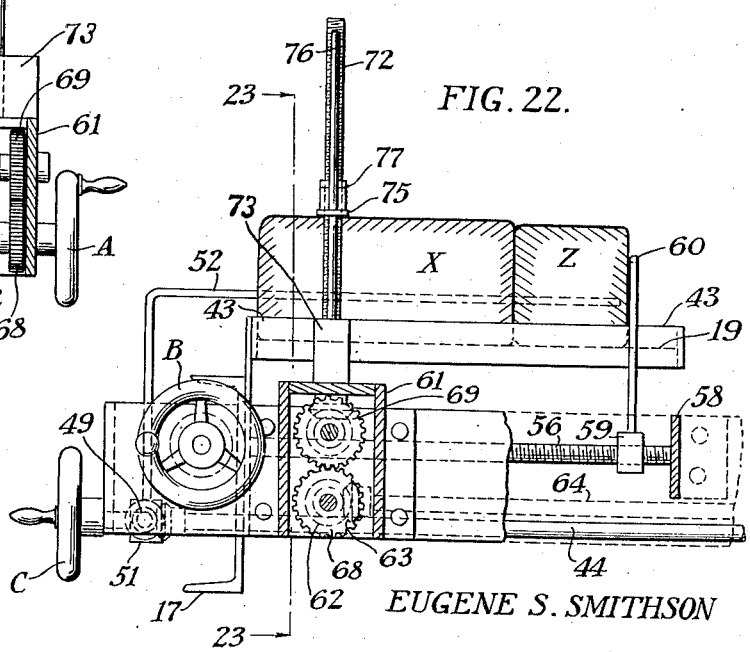
EUGENE S. SMITHSON
INVENTOR
BY Clarence W. Carroll
AGENT July 11, 1944.  E. S. SMITHSON  2,353,419
MACHINE FOR FORMING BOX BLANKS
Filed June 11, 1942   11 Sheets-Sheet 9

WIDTH ADJUSTING MECHANISM

LENGTH ADJUSTING MECHANISM

EUGENE S. SMITHSON
INVENTOR
BY Clarence W. Carroll
AGENT

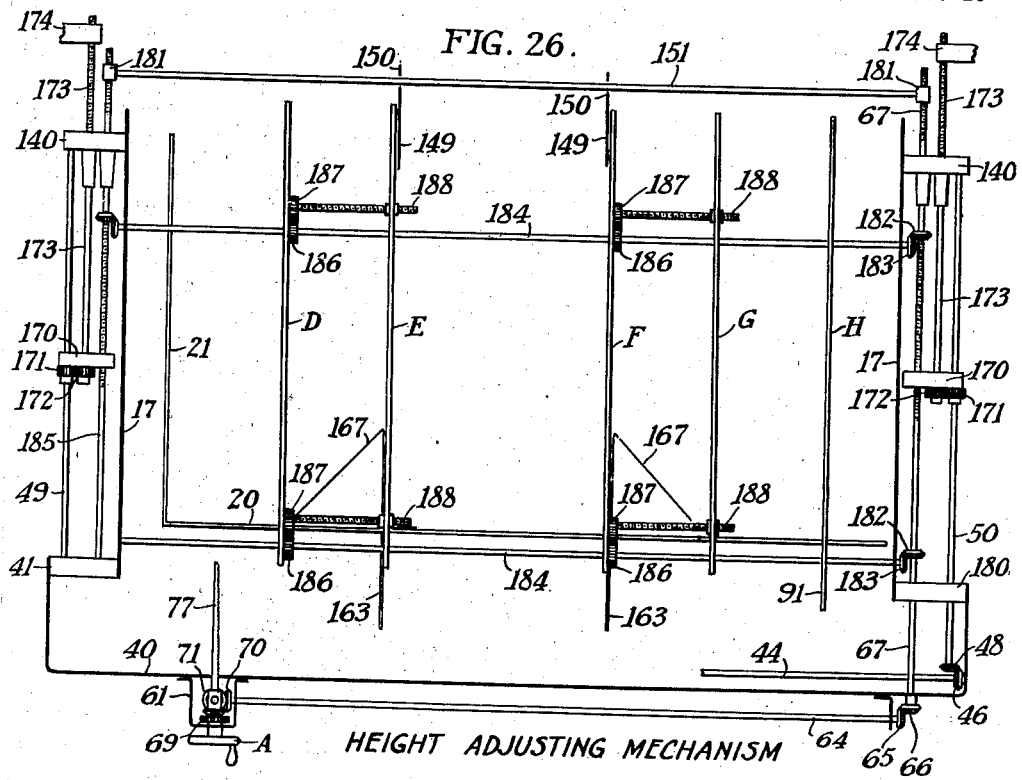
FIG. 26. HEIGHT ADJUSTING MECHANISM
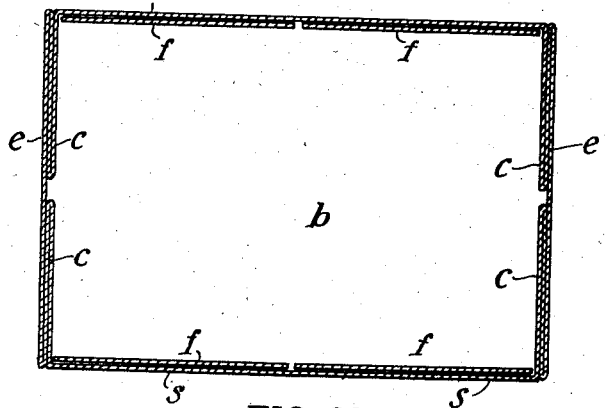
FIG. 27.
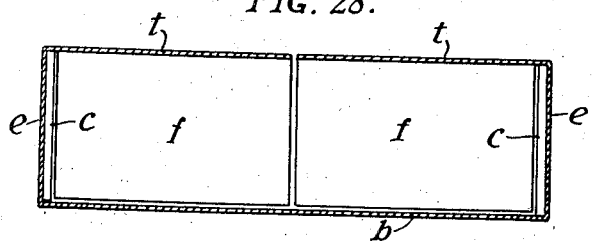
FIG. 28.
EUGENE S. SMITHSON
INVENTOR
BY Clarence W. Carroll
AGENT July 11, 1944.  E. S. SMITHSON  2,353,419
MACHINE FOR FORMING BOX BLANKS
Filed June 11, 1942  11 Sheets-Sheet 11
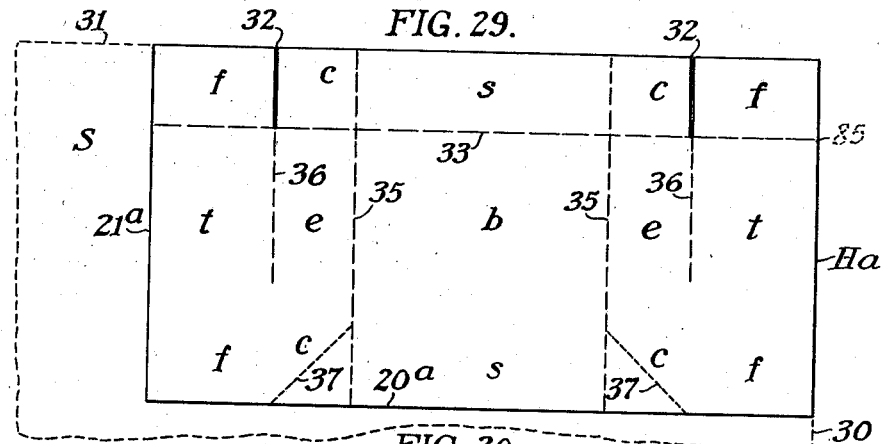
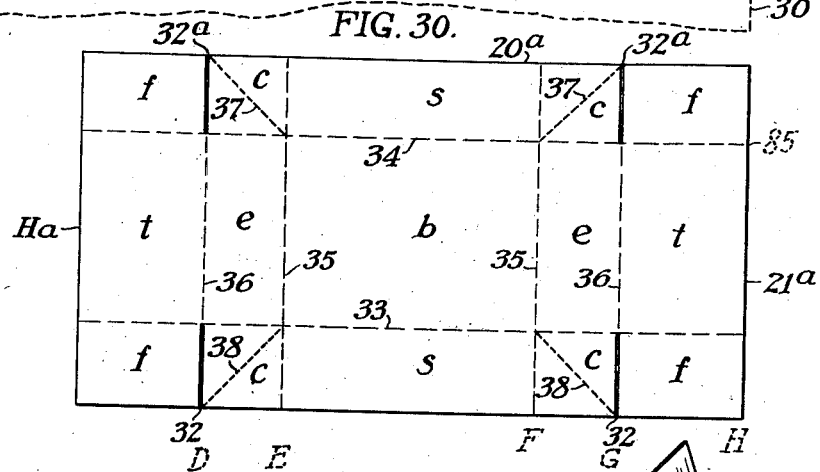
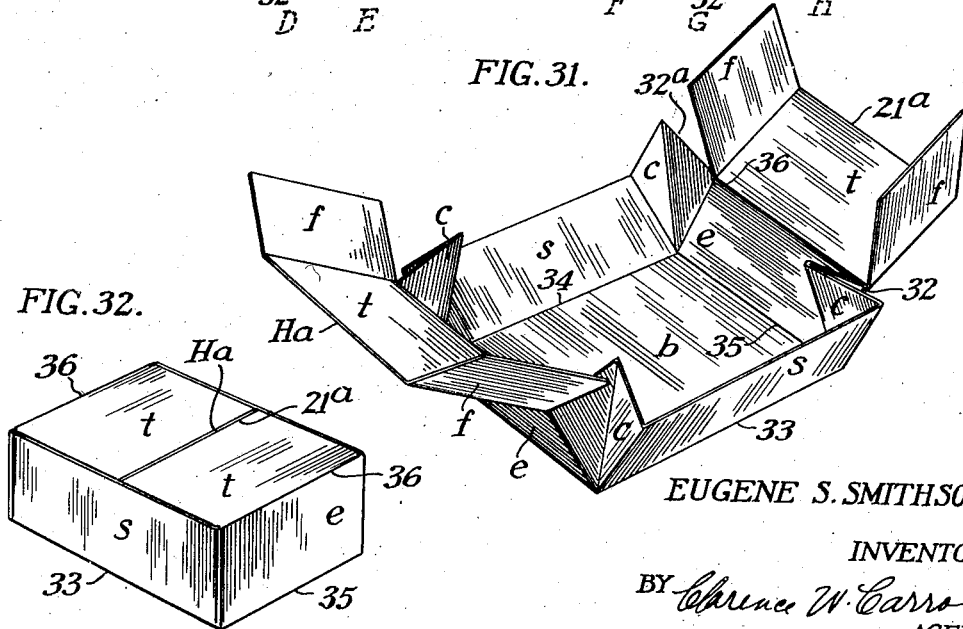
EUGENE S. SMITHSON
INVENTOR
AGENT Patented July 11, 1944

2,353,419

UNITED STATES PATENT OFFICE 2,353,419

MACHINE FOR FORMING BOX BLANKS

Eugene S. Smithson, Rochester, N. Y.

Application June 11, 1942, Serial No. 446,598

14 Claims. (Cl. 93—58.3)

This invention relates to machines for forming box blanks, and is particularly directed to a mechanism which will cut to required size a piece of box board or other selected material which when folded and closed will become a box of certain required dimensions and which does not require tape or adhesives to secure the corners thereof.

In most mercantile establishments there is a great waste of material and loss of time in packaging and shipping due to the necessity of wrapping an infinite number of items of many different sizes and shapes. Frequently ready made up cartons are used, which are likely to be too small or too large. Time is needlessly wasted selecting a carton of sufficient size, packing articles of merchandise therein and filling the unoccupied space with excelsior, paper, etc. Space in trucks, freight cars and shipping rooms is thus taken up unprofitably.

It is an object of this invention to eliminate the above conditions by creating a machine which will turn out a "tailor-made" carton that will fit any one or any group of items (within certain limits of size) with no wasted space therein. To this end, a gauging or size determining device is provided, comprising a table having one side wall and one end wall, on and against which the articles to be packed are placed, a series of adjustable gauges being then moved by the operator into contact with the top, the other end and the other side of the articles. The setting of the gauges automatically locates suitable creasing bars, knives and limit stops in the machine without any other attention from the operator so that when the blank is cut it will be ready for folding into a box that will exactly fit the articles on the table in all three dimensions, i. e., length, width, and height.

The blanking machine has been designed to produce, ready for folding, a blank for a box or carton of substantially the same type as that shown in the U. S. patent to John E. Potter, No. 1,003,150. The particular example illustrated in the drawings herewith is adapted to be set and adjusted manually, and the cutting and creasing is done by depressing a foot treadle. Obviously, these operations may be accomplished by the suitable application of power driven elements with either local or remote controls.

In using the machine the operator places the cans, boxes, or other articles to be packaged, on the gauging table and operates the controls to bring the side, end and height gauges into contact with the articles. He then places a sheet of boxboard or other selected material on a foretable, pushes one edge against an edge guide and into a pair of grippers, which are then drawn inwardly, carrying the rear edge of the board against a rear stop. The edge guide and rear stop having been automatically located by mechanism interconnected with the gauge bars in accordance with the three dimensions of the articles on the gauging table, the operator depresses the foot-treadle, which raises a platen and forces the board against knives which shear the board to form edges opposite the one edge guide and the rear stop, and simultaneously make two cuts at the rear edge and crease the blank at certain points where it will be folded. The operator then removes the cut blank, turns it around, replaces it in the grippers, draws it into the machine again, taking care to place the blank against the edge guide until the blank again reaches the rear stop. The platen is raised the second time, thereby cutting slits and forming creases opposite those formed in the first operation. The blank may then be removed, ready for folding around the articles. The operator is not required at any time to make any measurements or dimensional estimates to obtain a box of required size.

The drawings herewith illustrate a preferred form of the invention, but these should be construed as an example only, and not at all as indicative of structural limitations. The machine may be varied in detail and in general design, the scope of the invention being interpreted as coming within the terminology of the claims at the end of this specification.

In the drawings:

Fig. 4 is an enlarged fragmentary plan of parts shown in Fig. 1;

Fig. 5 is a vertical section on line 5—5 of Fig. 4;

Fig. 6 is an elevation of part of the left side of the machine, as it would appear looking from left to right of Fig. 2;

Fig. 7 is an enlarged fragmentary elevation of the left side of the carriage;

Fig. 8 is a section on line 8—8 of Fig. 7;

Fig. 9 is a left-side elevation of the edge-guide and associated parts;

Fig. 10 is an enlarged section on line 10—10 of Fig. 7;

Fig. 11 is a section on line 11—11 of Fig. 9, looking toward the rear of the machine;

Fig. 12 is a left side view of a slitting knife and one creaser;

Fig. 13 is a section on line 13—13 of Fig. 12;

Fig. 14 is an enlarged left side elevation of the back stop and associated parts;

Fig. 15 is a section on line 15—15 of Fig. 14;

Fig. 15A is a section on line 15A—15A of Fig. 12, showing the construction of a gripper detail;

Fig. 16 is a left side elevation of the diagonal-creaser mechanism;

Fig. 17 is an enlarged section on line 17—17 of Fig. 16;

Fig. 18 is a plan view on line 18—18 of Fig. 17;

Fig. 19 is a cross section of a modified creaser detail;

Fig. 20 is a side view of Fig. 19;

Fig. 21 is a top plan of the gauging mechanism and the platform for receiving the articles of merchandise;

Fig. 22 is a front elevation of Fig. 21;

Fig. 23 is a sectional elevation, looking toward the right side of the machine, on line 23—23 of Fig. 22;

Figs. 24, 25 and 26 are plan views in diagrammatic form, showing the operating connections for the creasers and knives;

Fig. 27 is a section plan of a folded-up box made from a blank formed on a machine constructed in accordance with this invention;

Fig. 28 is a vertical section of the box shown in Fig. 27;

Fig. 29 shows a boxboard blank after the first operation;

Fig. 30 shows the same blank turned around, and after the second operation;

Fig. 31 shows the blank in perspective, partly folded to box form; and

Fig. 32 is a perspective view of the completed box.

GENERAL DESIGN OF MACHINE

The machine in the specific construction shown herewith comprises in its broad aspects a stationary frame, rigidly constructed of structural steel channels, although obviously castings would be entirely suitable. Between a pair of longitudinal side members that extend forwardly over a table is a carriage, movable on rollers in a front-to-rear direction. Under the carriage and stationary on the machine frame are two knives, one of which is parallel to and near the left side of the machine, the other knife being near the front of the frame and extending transversely thereof. The cutting edges of these knives are directed downwardly and are so formed that they are adapted to shear a sheet of boxwood placed on the table and slid into the machine beneath the knives, when a vertically movable die-member or platen is raised. This platen normally lies in the same horizontal plane as the table. The latter action is shown as being accomplished by the operator through a foot-treadle, but could of course be a power operation. Hardened inserts on the platen cooperate with the knives in shear-fashion.

The movable carriage aforesaid includes a series of shafts, both transverse and longitudinal, and tie rods and bars to hold these in place. On the tie-rods, and moved by certain of the shafts, are creasers, adapted to impress deep marks at required points in the boxboard to render the blank foldable into a complete box. A second pair of short knives also cuts slots in one edge of the blank when the platen is raised. Suitable rear stops and an edge guide are also included with the creasers.

The gauging apparatus hereinbefore mentioned is also mounted on the carriage, and a table or platform thereon is adapted to receive articles of merchandise for which the box is intended. Bars or index fingers are adapted to be moved against the right side, the rear and the top of such articles, the left side, the front and the bottom of the articles being held by marginal rims and the platform as previously mentioned. These gauge bars are manipulated by the operator through convenient hand-wheels at the front of the machine.

The prime novelty of this invention lies in the construction and arrangement of parts whereby the manipulation of the hand wheels to bring the gauge bars into contact with the articles on the platform simultaneously moves the stops to define the limits of outside dimensions of the box blank, and the creasers to correctly impress the grooves to permit folds to be made, to form the top and bottom, the sides and the ends of a box. The operator is not required to do any other sizing operations.

SPECIFIC CONSTRUCTION

A more specific description of the construction of the machine and of its operation will now be set forth, which, with reference to the drawings, should enable those skilled in box making to understand and appreciate the novel features of the invention.

Figure 1:
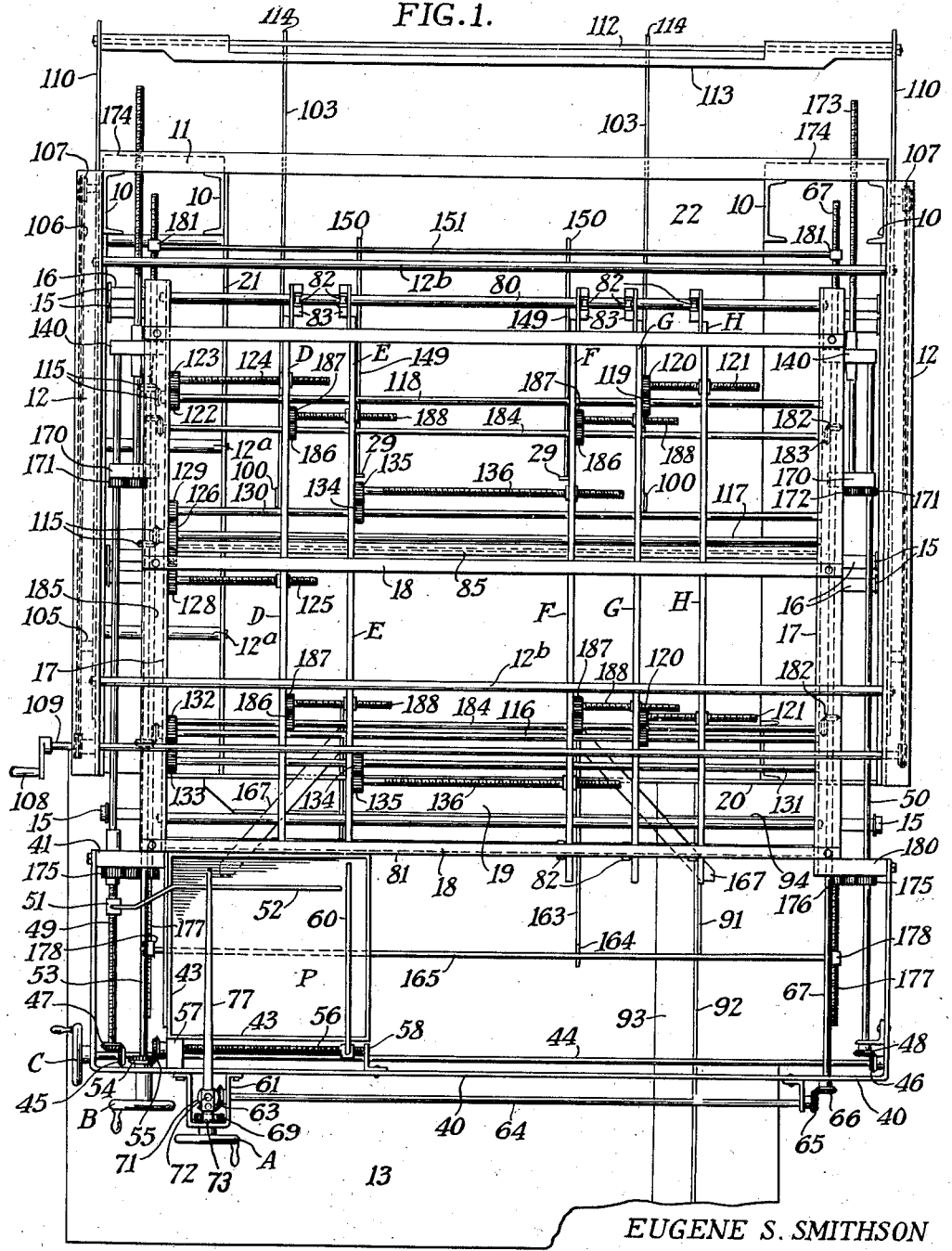
Fig. 1 is a general overall top plan view.
Figure 2:
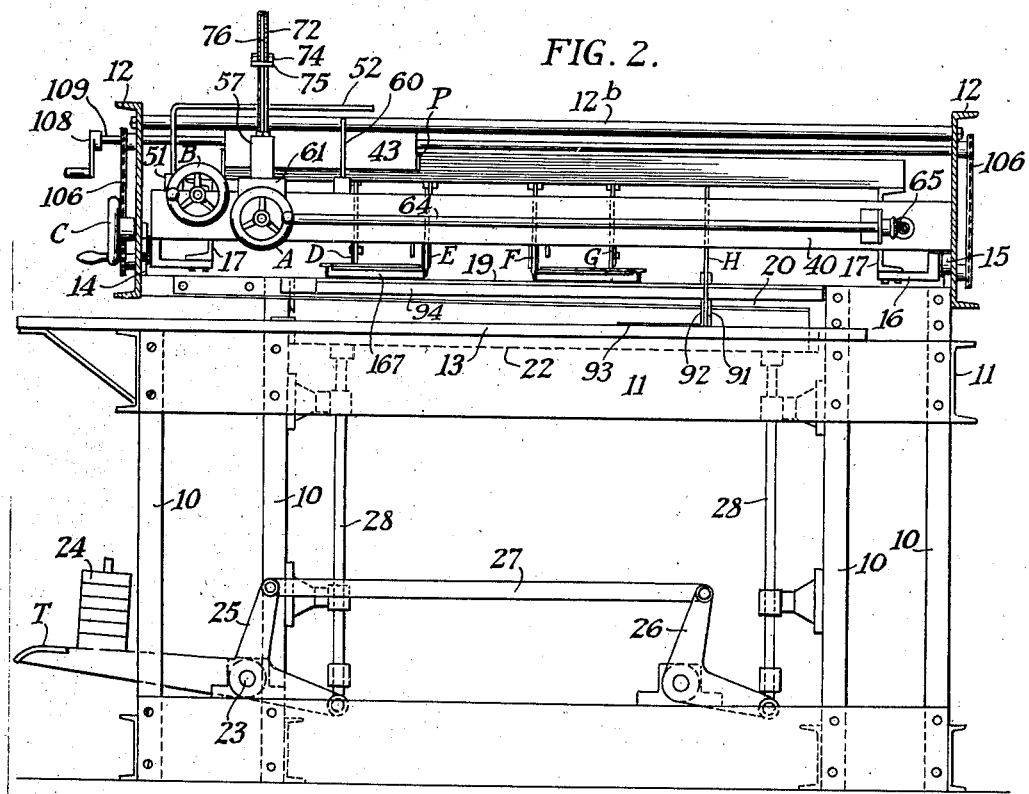
Fig. 2 is a front elevation.

In Figs. 1 and 2, the stationary frame is indicated as consisting of channel uprights 10 and transverse tie-beams 11. Deep channels 12 are solidly attached to the rear uprights and one is supported at its front end on a vertical channel member 10. The channel at the left side of the machine being unsupported because room must be provided for the insertion of a board to be cut, said board being first laid on the foretable 13. The channels 12 carry rails 14 on their inner faces (Figs. 5 and 8) which constitute guides for rollers 15. These rollers are mounted on blocks 16 bolted to the bottom flanges of channels 17, the latter being tied together by top bars 18 to form the rigid but mobile carriage hereinbefore mentioned. The rollers 15 are in pairs longitudinally, and thus support the channel side members 17 and enable the carriage to be moved forwardly and rearwardly as a unit on the fixed rails 14, but prevent it from being forced upwardly.

Figure 3:
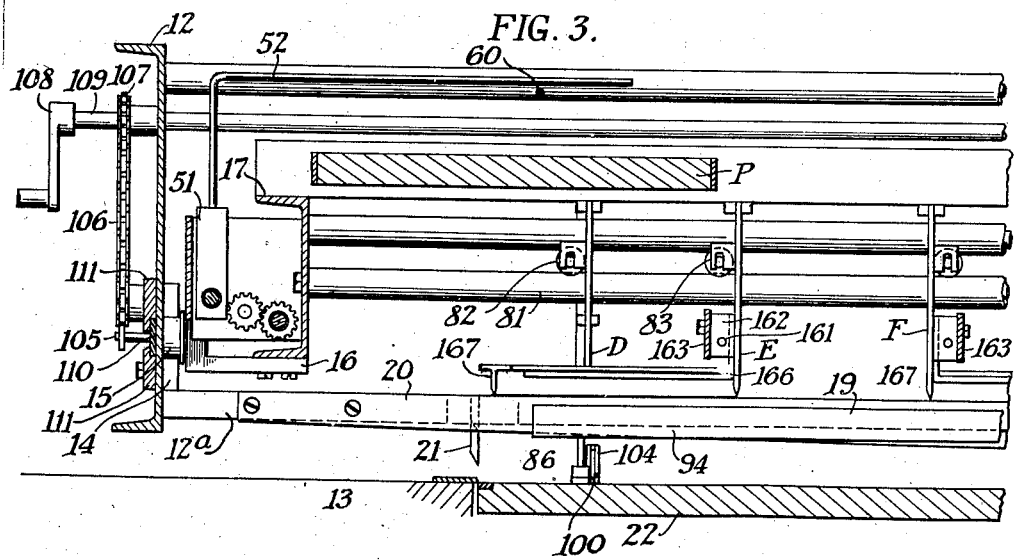
Fig. 3 is an enlarged portion from Fig. 2, parts being shown in section.

Extending across the machine and solidly supported on the channels 12 is a heavy bar 19 (Fig. 5) to which is attached a knife blade 20, its cutting edge being toward the rear, and the blade being tapered toward one end (Fig. 3). At a right angle to this blade and parallel to the left frame channel 12 is a similar knife 21, supported from said channel on studs 12a (Fig. 3). These knives are adapted to act in unison to cut a boxboard sheet when the platen 22 is lifted to carry the boxboard up against them, the left and front edges of the platen cooperating with the blades 20 and 21 to form a corner shear. The outside dimensions of the platen are sufficient to cover the greatest size of blank which the machine is capable of handling and creasing.

The platen 22 is lifted by means of a treadle T, pivoted at 23 and counter weighted at 24 (Fig. 2). A bell crank 25 is tied to a similar bell crank 26 by a rod 27. Vertically-guided push rods 28 raise the platen when the treadle is depressed.

suitable adjustable stops being provided (not shown in detail) to limit the movement of all these parts and prevent damage to the knives. The channels 12 may also be cross-braced by the rods 12b.

THE BOX BLANK

It is now in order to offer a brief description of the box blank as it must be turned out of the machine so that a box may be made up. Referring to Figs. 27 to 32, a sheet S of suitable boxboard of any reasonable size may be used, the right hand edge 30 and the rear edge 31 thereof (as related to the machine) being placed by the operator in contact, respectively, with a lateral limit stop H and a rear stop 29 when introduced into the machine, so that when the platen 22 is raised the knives 20 and 21 will cut the board at 20a and 21a respectively, to form the rectangular box blank, the overall dimensions of which will be as required.

This blank (or the box to be formed up therefrom) will have a bottom b, ends e, top flaps t, sides s, end flaps f and doubled-in corners c. When cut at 32 and 32a and creased at 33, 34, 35 and 36, it may be folded as in Fig. 31 and closed as in Fig. 32. The articles which the box is to hold are placed in it when in the condition of Fig. 31, the doubled-in corners c folding outwardly against the ends e. The top flaps t are brought down, the end flaps f being simultaneously tucked in at the sides s, these flaps likewise serving to hold the folded corners c against the ends e. It should be noted (Figs. 27 and 28) that when complete, there are three thicknesses of board across each end and two thicknesses along each side, thereby making an extremely strong and sturdy box that will not tend to open up, thus rendering tapes and staples unnecessary.

The blank as cut out from the boxboard in the first operation appears as in Fig. 29, with two slits 32 cut into its rear edge, longitudinal creases 35, 36, one lateral crease 33, and two diagonal creases 37 impressed in its surface as indicated by broken lines. After this operation the blank is withdrawn manually and the operator then turns it around 180 degrees, without turning it over, so that the rear edge (which was furthest into the machine) then becomes the front edge. The blank is then drawn again into the machine by means later to be described, until it comes up against the rear stop 29. It then occupies exactly the space it did in the first operation, relatively to the machine. The operator again steps on the treadle and raises the platen, thereby impressing creases 34 and 38 and making cuts 32a opposite the cuts 32. The blank then appears as in Fig. 30, and may then be removed and folded up as in Fig. 31. It should be noted that the creases 36 are less than the whole width of the bottom b at each impression, but become a continuous crease on the completed blank.

Obviously, any number of blanks may be turned out, one at a time, if no changes in dimensions are required, without altering the setting of the machine. When a change of size is required, that is, when a different article or group of articles is to have a blank produced to make a box to fit them, the machine will automatically move the creasers, the slitting knives and the limit stops to the correct relative positions as the operator manipulates the three control wheels to bring the gauge bars into contact with the articles.

When any dimension of the blank requires to be changed, a movement of the appropriate hand wheel causes relative movement only of the creasers that are related to that particular dimension. Further elucidation of this statement, with modifications thereof, will appear elsewhere in this specification.

GAUGING DEVICE

As one of the important features of the invention is the "gauging" device whereby the creasers, knives, stops, etc., are located in required relation, attention may now be directed to Figs. 21, 22, 23 and also Fig. 6. A yoke-like bar 40 joins the two side channels 17 of the carriage and extends forwardly therefrom. The platform P which is to hold the articles aforesaid, here represented by outlines X, Y, Z (as merely an example) is attached to the foremost of the tie-bars 18. Suitable braces 42 may also help to support the platform P, and a rim 43 on its front and one side prevents the articles from rolling off.

The handwheel C, which governs the width of the box, is fixed to a shaft 44 which has its right end supported in the yoke 40. This shaft carries bevel gears 45 and 46, mating with similar gears 47 and 48 on shafts 49 and 50 (see also diagrammatic plan, Fig. 24). The functions of these shafts will be further described. On the threaded portion of shaft 49 is a nut 51 from which a gauge bar 52 projects upwardly and then horizontally over the platform P. When the wheel C is rotated counter clockwise, the nut 51 carries the gauge bar 52 forwardly against the articles X, Y, or Z, and thereby, through mechanism to be described, determines the distance between the knife 20 and the rear stop 29, and also the location for the crease or fold mark 33.

The handwheel B, on a shaft 53 (Fig. 1 and Fig. 25) which governs the length of the blank, carries a large bevel gear 54 meshing with another 55 one-half its size, on a short threaded shaft 56 supported in bearings 57, 58. A nut 59 on this shaft carries a gauge bar 60 which will move transversely of the machine when the wheel B is manipulated, and as it contacts the right side of any one of the articles on the platform P, as shown, it causes, through coupled mechanism, the correct location of the side edge guide H and of certain parts which are adapted to impress creases longitudinally in the blank at 35, and in correct relation to the edge 21a of the blank.

The third handwheel A controls the height of the box, and is supported in a bracket 61 attached to the yoke 40. A bevel gear 62 on a stub shaft projecting from the wheel hub (Fig. 23) meshes with a bevel gear 63 on a transverse shaft 64, and this shaft carries a bevel gear 65 at its right end (Figs. 1 and 26) that meshes with another 66, on a shaft 67, the function of which will be described later in this specification. The stub shaft aforesaid also carries a spur gear 68 meshing with a mating gear 69, this gear in turn bearing a bevel gear 70 meshing with a similar gear 71 on a vertical threaded shaft 72, guided in a block 73 at the top of bracket 61. A nut 74, held against rotation by a lug 75 that travels on a guide rod 76 carries a finger or gauge bar 77 which will be moved downwardly when handwheel A is rotated counterclockwise (as viewed from the front of the machine) and into contact with the articles on platform P.

The movements set up by handwheel A accomplish a dual result, viz., the correct location of creasers to impress the diagonal fold marks 37 or 38, the location of the marks 36 with respect to marks 35, and of the rear edge of the blank in required relation to the creaser which impresses mark 33 and to the knife 20.

MECHANICAL OPERATION OF CREASERS AND STOPS

To fully understand the construction of the creasers, the edge guide, and the knives which cut the slits 32, 32a, attention is now directed to the top plan, Fig. 1, which shows a series of bars, parallel to the sides of the machine and spaced apart. These are designated D, E, F, G, H, from left to right, and are illustrated in further detail in Figs. 12, 13, 14, 4, 5, 16, 17 and 18.

All of these members are of substantial depth and are laterally movable on cross-rods 80 and 81 that are fixed between the side frames 17 of the carriage. It is thus obvious that the creasers D, E, F, G are capable of movement longitudinally of the machine with the carriage, and laterally independently of the carriage regardless of the latter's position with respect to the side frames 12 of the machine. The bars D to H are provided with rollers 82, mounted in bearings 83 in which they are vertically adjustable, so that the platen 22 at the top of its movement will not quite reach the lower V-shaped edges of these bars and therefore the boxboard will not be cut through except where the knives 84 (Fig. 12) are placed.

A transverse creaser bar 85 in the form of a structural steel T is fixed to the side channels 17 of the carriage and therefore moves with the latter at all times. The tops of the creasers D, E, F, G and the edge guide H are close to the underside of the bars 18, and the latter then take the upthrust created by the platen. The carriage as a whole is prevented from lifting by the rollers 15, in the fixed guides 14 (Figs. 4, 5, and 10).

The knives 84 for cutting the slits 32, 32a, are in duplicate, attached to the creaser bars D and G, and shear the boxboard in cooperation with a wedge-shaped shear block 86 that is held in place by guide dowels 87, some of which are provided with springs 88, so that as the block 86 is lifted with the platen, the springs are compressed. As the platen 22 returns to normal position, the springs 88 maintain the shear block 86 in contact with the upper surface of the platen, so that said shear block is continually in position to guide a blank thereover, and is also free to be moved laterally as required. Spring-pressed dowels 89 located forward of transverse creaser 85 serve as strippers to clear the blank from knives 84 and also from the edge-cutting knives 20 and 21.

It will be apparent, if Figs. 1 and 29 are compared, just which parts of the boxboard blank are acted upon by the bars D, E, F, G and H. The edges 21a and 20a are sheared by the knives 21 and 20 respectively. The edge Ha, which was the right edge of the board as originally introduced into the machine, is determined by the guide H. This guide is clearly shown in Figs. 9 and 11, and comprises the bar H, equipped with the rollers 82 to travel on the cross rods 81 and 80, and has a depending front portion 90 from which is suspended a pair of slightly separated plates 91, which straddle and run freely over an upstanding flange 92 attached to an angle plate 93 that lies on the foretable 13. A metal strip 94 attached to the heavy bar 19 which supports the front knife 20, rests in a notch in the flange 92 and keeps the entire guide in position against any front-to-rear movement, while permitting the whole structure (H, 90, 91, 92, 93) to move laterally as a unit.

The sheet of boxboard when placed in the machine is held against the upstanding flange of angle piece 93 (the so-called edge guide) and as it is drawn in, by means about to be described, it also bears against an auxiliary guide 95, fixed to a bar 96 that is pivoted on the plate H at 97, and this guide tends to keep the board aligned with the sides of the machine, or in other words, square to the knives. When the sheet S of boxboard is introduced by the operator as he holds the right edge against the guide 93 the leading-in or rear edge 31 of the board enters a pair of grippers 100 (Fig. 12) which have serrated jaws that tend to hold the boxboard after its edge has ridden up a slight incline 101 beneath the gripping dog 102, this incline being a part of a bar 103 (Fig. 5) which is guided between spaced plates 104 that are attached to the shear block 86. The bar 103 is freely slidable longitudinally (Fig. 15A).

One gripper assembly is at creaser D and another at creaser G, and they are drawn toward the rear or the front of the machine manually. Lugs 105 (Fig. 6) project from endless chains 106 that run over sprockets 107, mounted on studs projecting outwardly from the side frame channels 12. The chains are actuated by a hand crank 108 on the left side, the movement thereof being carried to the right-hand set of sprockets and chain through a shaft 109. The lugs 105 on either side are riveted to bars 110, guided in rabbeted strips 111 on the channel frames 12. The rear ends of the bars 110 are connected at the rear of the machine by a cross rod 112 and a reinforcing bar 113. Upstanding forked pieces 114 at the rear ends of the gripper bars 103 engage the rod 112 and are moved thereby forwardly or rearwardly, to either draw the boxboard into the machine or to eject it, in accordance with the direction of rotation of the crank 108. The bar 112 by engaging the forks 114 on the gripper bars 103 serves to connect the gripper bars and the slide bars 110 so that these members will move in unison whenever the bars 110 are actuated manually through operation of the crank 108 which moves chains 106.

CONSTRUCTION OF STOPS FOR REAR EDGE OF SHEET

In Figs. 14 and 15 are shown the stops which determine the location of the rear edge of the sheet of boxboard before the blank is cut out, and thereby the height of the finished box and the location of the creases 33 or 34 on the blank. There are two of these stops, one being near creaser E and the other at F. Depending from guides 144 on each of these creasers are spring-pressed dowels 145 carrying a bottom bar 146. A clip 147 on the dowels supports spaced guide bars 148 between which is a flat bar 149, extending toward the rear and terminating in an upstanding fork 150 that embraces a transverse rod 151. This rod is also a part of the mechanism for determining the height of the box and its function will be described further in this specification.

The bar 146, the guides 148, the bar 149 and fork 150 are free to move up and down with the platen 22 as it is elevated to cut out the blank; in fact, these members actually rest on the platen. The bar 149 is free to move longitudinally in the guides 148.

The upstanding stop piece 29 mentioned hereinbefore is contacted first by the entering edge 31 of the boxboard S as the latter is drawn rearwardly by the grippers 100. The piece 29 is fixed at the front end of a rod 152 that is slidable in guides 153. The rear end of rod 152 connects with a bell-crank 154 which carries a second rod 155 urged upwardly by a spring 156. A hammer 157 pivoted at 158 on one portion of the fork 150 is arranged to strike a bell 159 to give an audible signal to the operator and apprise him that the boxboard is in position for cutting and creasing. The hooked end of rod 155 slips off a shoulder on the hammer 157 and when the blank is withdrawn from the machine the parts are returned to normal by the spring 156. The piece 29 can move back only until it strikes the front end of the bar 146.

CREASERS AND KNIVES, AND THEIR MOVEMENTS AS GOVERNED BY THE GAUGING DEVICE

1. *Adjustment for length of the blank*

A consideration of the blank as shown in Fig. 29 will make the required relative movements of the creasers and knives readily understandable as the designations D, E, F, G and H on said figure in broken lines indicate the crease lines impressed by these elements, and one edge of the blank.

Let it be assumed first that from any given position of the creasers and knives, a change must be made, as determined by the articles placed on platform P. If the length of the box (the space on the blank between lines 35) is to be greater, obviously the creasers E and F must be moved further apart. The length of the top flaps t, added together, must equal the length of the bottom panel b, so that each flap must be allotted one-half of the increased length of the bottom. It should be borne in mind that in the design of the present example of the invention, all dimensions referred to as "length" on the box blank run transversely of the machine and of Figs. 29 and 30, and all dimensions referring to "width" run longitudinally of the machine and therefore from top to bottom of said figures. All dimensions referring to "height" affect panels e and s, and therefore run both ways.

If, for instance, the box is to be lengthened two inches, the distance from the edge 21a, which will be cut by knife 21, to the first crease 36 must gain one inch. Assuming that the height of the box is to remain as it was, the creasers D and E must retain their relative positions and both move an inch to the right. The creaser F must move two inches farther from creaser E (to gain the required two inches on panel b) or a total of three inches from knife 21. The relation between creaser F and G must not be changed, as this would affect the height, but edge guide H must move one inch further from G than it was, or a total of four inches further from knife 21. All of these relative movements are accomplished through shafts and gearing graphically illustrated in Fig. 25.

The shaft 53, rotated by handwheel B, is supported in suitable bearings on the left hand member 17 of the movable carriage. Three sets of equal-sized bevel gears 115 turn in unison transverse shafts 116, 117 and 118, all of which extend through suitable clearance holes in all the creasers and terminate in the right hand carriage member 17. Shafts 116 and 118 have gears 119 meshing with gears 120 on two threaded spindles 121. These parts are in duplicate to insure parallel movement of the creasers without any binding action on the guides. Spindles 121 are threaded through nuts fixed in edge guide bar H, and the latter thereby will be moved toward or away from creaser G by movement of handwheel B.

Also on shaft 118 is a gear 122 meshing with a gear 123 of the same size on a threaded spindle 124 extending through a nut in creaser D. Shaft 117 drives a spindle 125 also threaded into creaser D by means of a gear 126 which is twice the diameter of gear 122, and through an idler 127 to a gear 128 equal in size to 126. A gear 129 on a countershaft 130 the same size as gears 122 and 123 causes this shaft to revolve at twice the speed of shaft 117. Similarly, a countershaft 131 is driven, through gears 132, 133 at the same speed as countershaft 130. Gears 134 on these countershafts mesh with gears 135 on spindles 136 which are threaded through creaser F.

If the gearing as above described is traced through, it will be evident that creaser F will move away from the creaser E twice as fast as creaser D will move from the left side of the machine (knife 21) and that edge guide H will move away from creaser G at the same speed D moves from knife 21. As gears 134, 119, etc., are rotative in collars in their respective creasers, they merely slide along on their shafts, all of which are provided with keyways throughout substantially their full lengths.

2. *Adjustment for width of blank*

Figure 24:
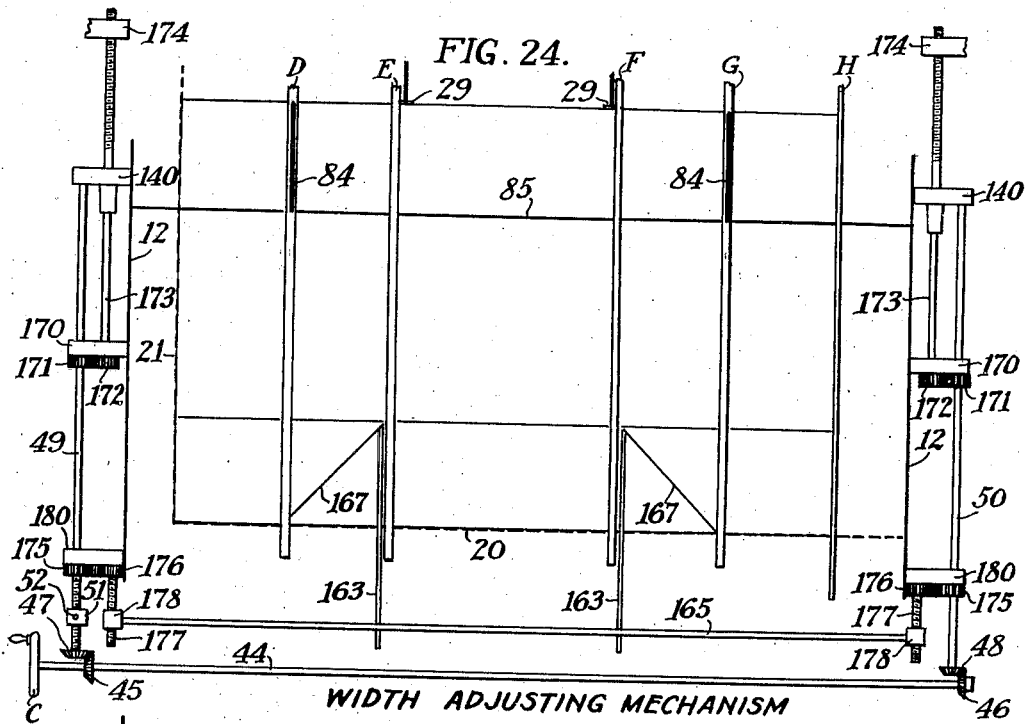

The mechanism for adjusting the width of the box (the vertical dimension of panel b, Fig. 29) is shown in Fig. 24. Handwheel C rotates shaft 44 mounted on the bar 40, and through gears 45, 46, 47, 48 drives shafts 49 and 50 mounted on the side members 17 of the carriage. These shafts terminate in brackets 140 mounted on the members 17, and pass through blocks 170. The latter are not attached to the channels 17, but "float" as will presently appear.

It will be necessary to describe only shaft 50 and associated parts, as shaft 49 has exactly the same arrangement except that it is "opposite hand." The block 170 carries matched spur gears 171, 172 which are revoluble in collars in said block but not longitudinally separable therefrom. Shaft 50 has a keyway practically its entire length, and gear 171 is slidable thereon but must rotate with the shaft. As shaft 50 rotates therefore, the gear 171 turns gear 172 and as the latter is solidly keyed to a shaft 173 this shaft must revolve also. The rear end of shaft 173 is threaded through a fixed bracket 174 on one of the frame posts 10. Shaft 173 is also held by suitable collars in fixed longitudinal relation to bracket 140 on the carriage frame 17, and therefore the whole carriage is moved either forwardly or rearwardly depending on the direction of rotation of handwheel C. The carriage must move rearwardly if a wider blank is to be cut, that is, all parts of the carriage and the creasers must move away from knife 20. The gear 171 meanwhile slides on shaft 50.

A gear 175 fixed on shaft 50 and meshes through an idler with a similar gear 176 on a threaded stub shaft 177 supported on the carriage. A nut 178 is adapted to travel on this stub shaft, and the rod 165 extends from it to a duplicate nut on the other side of the machine. Rod 165, as previously described, engages the slidable bars 163 that are attached to the diagonal creasers 167.

CONSTRUCTION OF THE DIAGONAL CREASERS

The mechanism for impressing the diagonal creases 37 and 38 in the blank (Figs. 29 and 30) is best illustrated in Figs. 16, 17, and 18. The creases 37 are impressed first, extending to the front edge 20a of the blank, and then when the latter is turned around, the creases 38 are impressed in the same location, relatively to the machine, but of course are at the edge of the blank which was the rear edge in the first operation. The diagonal creasers are in duplicate, but are constructed right and left, that is, one is just the opposite "hand" of the other in location and its relation to the other parts of the machine.

On each of the creaser bars E and F are lugs 160 supporting rods 161. For convenience, the parts associated with creaser E only will be described. On the rod 161 blocks 162 are slidable; and these blocks carry flat bars 163, forked at their front ends 164 to engage a transverse rod 165, by means of which the bars are moved forwardly or rearwardly. Also carried by and attached to blocks 162 are brackets 166, at the outer ends of which are supported a T-bar 167, the lower edge of which is V-shaped to provide a creasing impression. The edge may be alternatively, a thin insert 168 with "saw-tooth" edge, as in Figs. 19 and 20, to nearly perforate the blank. Whether the lower or creasing edge of the member 167 is "Veed" as in Fig. 17 or serrated as in Fig. 20, its edge is at the same level as the lower edge of all the other creasers. As clearly evident in Figs. 18 and 1, the creasers 167 are placed at an oblique angle to the creasers D, E, F, G.

Fixed to creasers E and F are bars 169 which are strong enough to take the upthrust of the brackets 166 when the platen is raised, because the rods 161 are intended to serve only as guides.

Under the conditions set forth above, the carriage members 17 and all the creasers move rearwardly, except the diagonal creasers 167. Due to the fact that the stub shafts 177 are rotating, and because they have left-hand threads, the rod 165 and the diagonal creasers 167 are backed off, or moved forwardly at the same rate that the carriage is moved rearwardly, or vice versa, the net result of this action being that the diagonal creasers have no movement relatively to the machine or any stationary part thereof, and therefore, to the knife 20. The length of the triangles on the blank, of which the straight side represent the height of the box and the hypothenuse represents the creasers 167, is unchanged.

The distance between the knife 20 and the long creaser 85 does change as the carriage moves, and the width of panel b of the blank, which becomes the bottom of the box, is varied accordingly. The back stops 29 are associated with and operated by the height adjusting mechanism, and therefore travel with the carriage as the width adjusting mechanism is varied as just described and therefore no change is made in the height of the upper box side s, Fig. 29.

3. Adjustment for height of blank

Referring once more to Figs. 29 and 30, it will be seen that if a change in the height of the finished box is to be made, the width of side panels S must be varied, and likewise the length of the end panels e must be increased or decreased accordingly. Again it should be noted that "length" refers to right-to-left in the drawings and "width" refers to top-to-bottom. This requirement, viz., changing the creasers, stops and other mechanical components in two directions 90 degrees apart entails a number of connections, but all of these are accomplished by rotation of handwheel A, and when the gauge 77 has been brought down thereby onto the top of the tallest piece of merchandise on platform D, the operator naturally does not try to move it further, and when the wheel A is stopped it will be found that the panels e and s on the blank are of such dimensions that when folded up, the box will be just deep enough to closely accommodate the articles.

Referring now to Figs. 26, 21, 22 and 23, it will be seen that shaft 64 (revolved by handwheel A through gears 62 and 63) carries bevel gear 65 meshing with bevel gear 66 on shaft 67. This shaft is supported in suitable bearings 186 and the bearings 140 on the carriage. Its rear end is threaded through a nut 181 in which one end of rod 151 is supported. Bevel gears 182 drive mating gears 183 and transverse shafts 184 extending through the left member 17 of the carriage, where they drive a shaft 185, corresponding in structure and function with shaft 67, except that the front end of this shaft terminates in block 41. Shaft 185 is threaded through another nut 181 and therefore both nuts 181 move rod 151 in a front to rear direction while maintaining it parallel with the knife 20.

It will be seen in Fig. 26 that shafts 67 and 185 are threaded through blocks 170 that carry the gears 171 and 172. Obviously therefore, as these shafts revolve, they will advance through the blocks, because the blocks cannot move, being retained by collars on the tail-shafts 173 that are threaded into the fixed brackets 174. The shafts 173 and the gears 171, 172 remain stationary, the gears 171 sliding on shafts 49 and 50, which have long keyways to accommodate this movement.

During the movement described in the preceding paragraph the gears 175 and 176 are out of action (Fig. 24) because shafts 49 and 50 are not revolving. Hence, the nuts 178 and rod 165 are carried along with the carriage and all the other parts that are moving rearwardly and the diagonal creasers 167 are carried back accordingly, increasing the sides (and hypothenuse) of the triangles on the blank aforementioned. At the same time, the carriage is being moved back, and with it the creaser 85. The distance between the rear points of the creasers 167 and the creaser 85 is not altered, because they all are moving with the carriage, therefore the width of bottom panel b is unchanged.

As shafts 67 and 185 are rotating at equal speeds, the nuts 181 and rod 151 are carried backwardly (assuming in all of the above that the height of the box is to be enlarged) so that the rod 151 moves, relative to knife 20, at twice the speed of the carriage and the creasers 167, and moves the stops 29 to required positions (see Fig. 14).

The result of this movement is that the upper side panel s in Fig. 29 is widened at the same rate as the lower panel s, as the backstops 29 governed by rod 151 determine the final location of the edge 31 of the boxboard.

Coincidentally, with the gain in height of panels s, the panels e must be correspondingly lengthened, and this is accomplished by enlarging the space between creasers D and E and the space between F and G without altering the space between knife 21 and D, between E and F, or the space between G and H. Further reference to Fig. 26 will make clear the action which accomplishes the above result.

Each of the shafts 184 carries spur gears 186 that revolve in collars in creasers D and F. These gears mesh with gears 187 that drive rods 188 that are threaded through nuts set in creasers E and G. If the shafts 184 are revolving, the threaded rods 188 will either move creasers D and E, and creasers F and G, farther apart or pull them closer together. The rate at which these creasers move apart, due to the mechanical proportions of these components, is equal to the rate at which diagonal creasers 167 move away from knife 20 and the rate at which the backstops 29 and allied parts move away from creaser 85 and other parts of carriage 17. Obviously, therefore, all four side panels of the blank will be increased in width and length at the same rate and to the same dimensions, so that all four sides of the finished box will be of the same height.

The foregoing detailed description of the construction and operation of the machine is intended to be full and exact enough to enable anyone familiar with blank forming machinery to design and build an apparatus which will produce a box blank which may be folded up to make a box that will exactly fit the largest dimensions (length, width and height) of any article or group of articles placed on the gauging platform, within the range of sizes to which the machine is limited. These dimensions are determined and controlled directly from the articles themselves, without any measuring, estimating, or guesswork by the operator.

Figure 25:
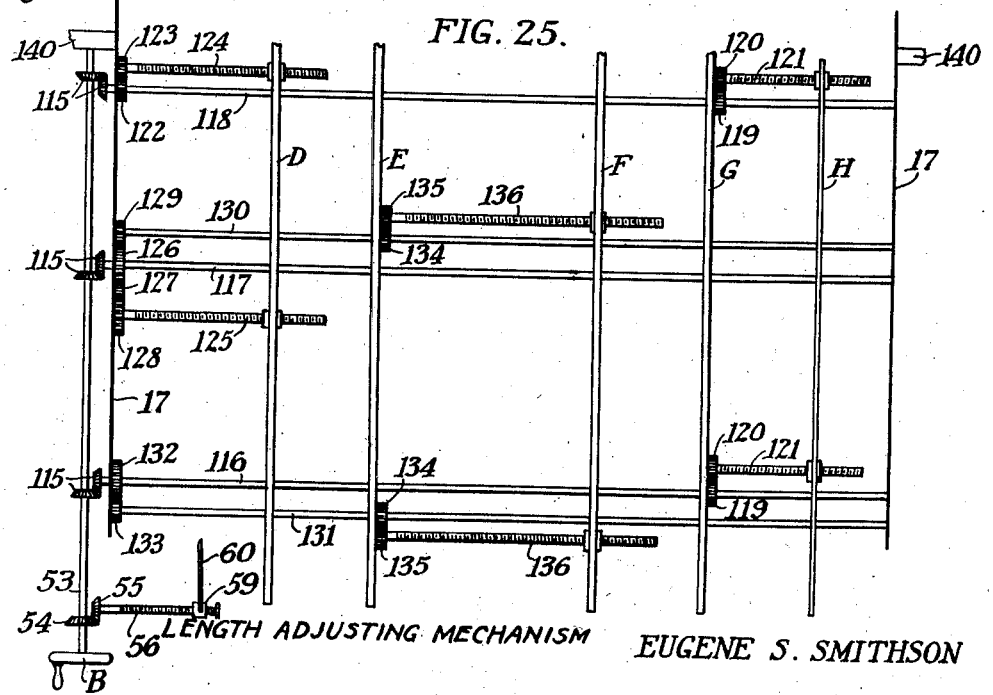

In Figs. 24, 25 and 26 the threaded shafts through the creaser bars might apparently interfere with each other as the creasers are drawn closer together. Actually they are in different planes, and as clearance holes are provided in the adjacent creasers there will be no interference. In certain of the figures of the drawings some parts are omitted. In some, as for instance Fig. 1, because the small scale would only result in confusion if the omitted parts were to be shown. It will be found, however, that all of the parts enumerated may be discerned and their relation to adjacent parts will be clearly indicated in other detailed large scale figures.

It is to be understood that this invention is not limited to the precise form of construction and design illustrated in the drawings herewith, but is broadly intended to include any mechanism capable of forming and creasing a boxblank for folding, and in so doing, to automatically establish the dimensions of the various panels of the blank by bringing movable members into contact with the articles which the finished and formed-up box is intended to fit.

It is conceivable, for instance, that the knives and creasing devices, instead of being arranged on supports on a fixed frame might be grouped on a frame hinged to a base and might be lifted up from such a base and the boxboard laid down on a receiving slab, the creasers and knives then being brought down onto the board, manually or by power, to crease and cut out the blank. Other forms may be devised to accomplish the object of the invention, and it is therefore intended that the scope thereof should be considered to embrace any and all structures that may be clearly construed as defined by the following claims.

What I claim is:

1. A machine for forming box blanks comprising, in combination, a support for articles intended to be enclosed in a box completed from one of said blanks, adjustable box blank forming mechanism, means for adjusting said mechanism to a condition predetermined by the dimensions of said articles, including movable members adapted to contact said articles at separated points and connected with said mechanism and means for cutting a blank from sheet material.

2. A machine for forming box blanks comprising, in combination, blank forming mechanism, a support for articles which a finished box made from a blank is to fit, a series of gauges adapted to contact said articles, operating connections between said gauges and said mechanism whereby the parts of the latter are automatically placed in required condition to produce a blank as aforesaid when the gauges are moved into contact with the articles on the support and means for cutting a blank from sheet material.

3. A machine for forming box blanks comprising, in combination, a support for articles intended to be enclosed in a box completed from one of said blanks, mechanism including spaced members adapted to slot and crease a blank, movable gauges adapted to contact articles on the support, connections between the mechanism and the movable gauges whereby the spacing of the members of the mechanism to required relation is controlled by the positions of the movable gauges and means for cutting a blank from sheet material.

4. A machine for forming box blanks comprising, in combination, a support for articles which a box completed from one of said blanks is to fit, blank forming and creasing mechanism, movable members adapted to contact the articles on the support, connections between said movable members and the blank creasing mechanism whereby said mechanism is automatically adjusted to produce a blank adapted to be formed into a box as aforesaid when the movable members contact said articles and means for cutting a blank from sheet material after said mechanism is so adjusted.

5. A machine for forming box blanks comprising, in combination, a support for articles which a finished box made from one of said blanks is to fit, blank forming and creasing mechanism, movable members adapted to contact said articles at a plurality of points, connections between said movable members and the blank creasing mechanism whereby the components of the latter are moved into required spaced relation to produce a blank and means for cutting a blank from sheet material while the creasing mechanism components are spaced as aforesaid.

6. A machine for forming box blanks comprising, in combination, a frame, a table adapted to receive a sheet of blank material, a platform adapted to receive articles which a box made from a blank is to fit, movable gauges adapted to contact said articles at separated points, blank forming mechanism movable in the frame, and connections between the gauges and said mechanism so arranged that movement of the gauges into contact with the articles on the platform causes relative movement of the components of the blank forming mechanism in such manner that they may produce a blank of required dimensions, and means for cutting said blank from the blank material.

7. A machine for forming box blanks having a frame, a platen, means for introducing a sheet of blank material, blank forming and cutting mechanism, means for holding in fixed position one or more articles of merchandise or the like, movable gauges adapted to contact said articles, and connections between the gauges and the blank forming mechanism whereby the component parts of the latter are adjusted automatically to required relative positions when the gauges are brought into contact with said articles, and means for moving the platen to move the blank material against the forming and cutting mechanism.

8. A machine for forming box blanks comprising a frame, a movable platen, stationary knives supported on the frame and aligned with two sides of the platen, a carriage movable on the frame, creasing bars, knives, and marginal stops adjustable on the carriage into different spaced relations, means for introducing a sheet of boxboard into the machine, a platform adapted to receive material for which the box is to be made, gauges associated with the platform and adapted to be moved into contact with the articles thereon, and connections between the gauges, the carriage and the creasing bars whereby movement of the gauges establishes the required relative positions of the creasers and the knives to cut from a sheet of boxboard a blank of required dimensions.

9. A machine for forming box blanks having mechanism for establishing the blank dimensions to suit the dimensions of one or more articles to be contained in the finished box, said mechanism comprising a frame, a carriage movable on the frame, creasers and stops movable on the carriage, a platen, fixed knives adapted to cut a blank when a sheet of boxboard is placed against said stops, a platform adapted to receive said articles, gauges movable into contact with the articles, and connections whereby the stops, the carriage and the creasers are moved in accordance with the movement of the gauges to required relative positions.

10. A machine for forming box blanks having blank forming mechanism, knives for cutting a blank from sheet material, creasers adapted to impress fold lines in the blank, said creasers being movable in more than one direction relative to the knives, a support for articles which a box made from a finished blank is intended to fit, gauge members movable into contact with the articles, and connections between the gauge members and the blank forming mechanism whereby the latter is adjusted in accordance with the movement of the gauge members to produce a blank of required dimensions.

11. A machine for forming box blanks comprising, in combination, movable members adapted to establish the dimensions of a box blank and to impress creases therein, knives for cutting a blank to said dimensions, a platform for receiving articles of merchandise or the like, gauges movable into contact with said articles, and connections between the gauges and the movable members to move the latter in accordance with the movement of the gauges, whereby the dimensions of the box blank are predetermind before cutting so that the blank when folded will form a box to fit said articles.

12. A machine for forming box blanks, having a frame, a carriage movable on said frame, blank forming mechanism supported on the carriage and movable in a plurality of directions with respect to the carriage, means for introducing a sheet of boxboard into the machine, mechanisms for locating said boxboard in a predetermined position, knives for cutting a boxblank from said board, a platform or receptacle for receiving and holding articles which a finished box is to fit, a series of feeler gauges adapted to be moved simultaneously or separately into contact with two or more sides of said articles, and mechanism connecting the gauges, the blank forming mechanism and the locating mechanism and movable therewith whereby the relative positions and spacings of the latter and the knives conforms proportionally to the positions of the gauges.

13. A machine for forming box blanks having a frame, a carriage movable in two directions on said frame, blank forming mechanism supported on the carriage and movable in a plurality of directions with respect to the carriage, means for introducing a sheet of boxboard into the machine, mechanism for locating said boxboard in a predetermined position, knives for cutting a boxblank from said board, means for holding one or more articles of merchandise or the like in fixed position on the machine, gauging mechanism adapted to be moved into contact with said articles, and connections between the gauging mechanism and the blank forming mechanism whereby movement of the gauging mechanism into contact with said articles establishes the spacing and relative positions of the component parts of the blank forming mechanism to produce a box blank which is capable of being folded to make a box, the dimensions of which will conform to the extreme dimensions of said articles.

14. A machine for forming box blanks having a frame, blank forming and creasing mechanism movable in a plurality of directions relatively to the frame, means for moving a sheet of boxboard to a required position in the machine, means for cutting a blank from said boxboard, gauges movable to positions corresponding to a plurality of dimensions of articles which a box made from a blank is to fit, means for establishing required positions of the components of the forming and creasing mechanism, and connections between said mechanism and the gauges whereby said required positions of said components are controlled by and in accordance with the movement of said gauges.

EUGENE S. SMITHSON.